United States Patent
Naik et al.

(10) Patent No.: US 12,224,414 B2
(45) Date of Patent: Feb. 11, 2025

(54) METHOD AND SYSTEM FOR RECOVERY OF METALS FROM SPENT LITHIUM ION BATTERIES

(71) Applicant: AGR LITHIUM INC., Bellevue, WA (US)

(72) Inventors: Amol Naik, Noida (IN); Rupesh Singh, Noida (IN); Vipin Tyagi, Bellevue, WA (US); Nishchay Chadha, Singapore (SG)

(73) Assignee: AGR LITHIUM INC., Houston, TX (US)

( * ) Notice: Subject to any disclaimer, the term of this patent is extended or adjusted under 35 U.S.C. 154(b) by 21 days.

(21) Appl. No.: 18/237,751

(22) Filed: Aug. 24, 2023

(65) Prior Publication Data

US 2024/0072320 A1 Feb. 29, 2024

Related U.S. Application Data

(60) Provisional application No. 63/400,938, filed on Aug. 25, 2022.

(51) Int. Cl.
*H01M 10/00* (2006.01)
*C22B 1/24* (2006.01)
(Continued)

(52) U.S. Cl.
CPC ............ *H01M 10/54* (2013.01); *C22B 1/24* (2013.01); *C22B 3/22* (2013.01); *C22B 7/007* (2013.01)

(58) Field of Classification Search
CPC ..... H01M 10/54; H01M 10/0525; C22B 1/24; C22B 3/22; C22B 7/007; C22B 26/12; Y02W 30/84
See application file for complete search history.

(56) References Cited

U.S. PATENT DOCUMENTS

2013/0302226 A1 11/2013 Wang et al.
2018/0261894 A1 9/2018 Wang et al.
(Continued)

FOREIGN PATENT DOCUMENTS

CN 112746174 A 5/2021
CN 113322376 A * 8/2021 ............. C01D 15/08
(Continued)

OTHER PUBLICATIONS

Jiang et al., A Method for Recycling Valuable Metal From Active Material of Waste Lithium Ion Battery, Aug. 2021, See the Abstract. (Year: 2021).*

(Continued)

*Primary Examiner* — Anca Eoff
*Assistant Examiner* — Monique M Wills
(74) *Attorney, Agent, or Firm* — Morgan, Lewis & Bockius LLP

(57) ABSTRACT

A method for obtaining a metal salt from a spent lithium-ion (Li-ion) battery may include contacting a leaching solvent to a portion of the spent lithium-ion battery to form a first dispersion. The first dispersion is heated to a temperature in a range from 50° C. to 90° C. by applying microwave radiation. The temperature of the first dispersion is maintained to be in the range from 50° C. to 90° C. for a period in a range from 10 seconds to 5 minutes by further applying microwave radiation to the heated first dispersion. The first dispersion is filtered to obtain a first filtrate. A first base is contacted with the first filtrate to increase a pH of the first filtrate to a first predetermined value to precipitate a first metal salt.

17 Claims, 4 Drawing Sheets

(51) Int. Cl.
    *C22B 3/22*     (2006.01)
    *C22B 7/00*     (2006.01)
    *H01M 10/54*     (2006.01)

(56) References Cited

U.S. PATENT DOCUMENTS

| | | |
|---|---|---|
| 2021/0079495 A1 | 3/2021 | Harris et al. |
| 2021/0324495 A1 | 10/2021 | Rohde et al. |
| 2023/0369668 A1 | 11/2023 | Naik et al. |

FOREIGN PATENT DOCUMENTS

| | | |
|---|---|---|
| KR | 2022-0115679 A | 8/2022 |
| TW | I644468 B | 12/2018 |
| TW | I111270073 A | 6/2020 |

OTHER PUBLICATIONS

International Search Report issued in related International Application No. PCT/US2023/031057 dated Mar. 1, 2024.

Gega et al. "Leaching of zinc and manganese from used up zinc-carbon batteries using aqueous sulfuric acid solutions." Physicochemical Problems of Mineral Processing 46 (2011): 155-162; Dec. 10, 2023.

International Search Report issued Sep. 12, 2023 for International Patent Application No. PCT/US23/22232.

\* cited by examiner

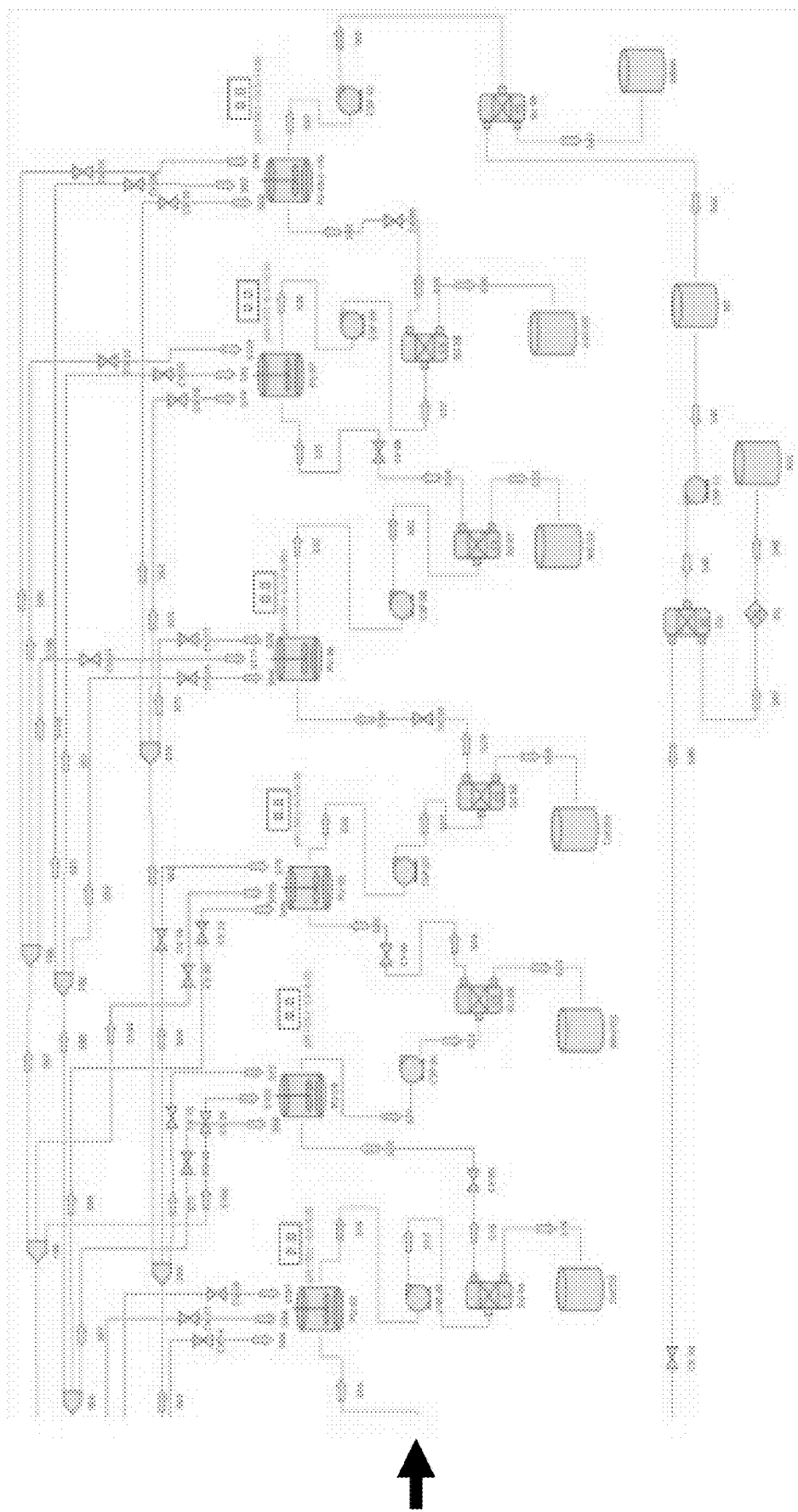
FIGURE 3 (Contd.)

METHOD AND SYSTEM FOR RECOVERY OF METALS FROM SPENT LITHIUM ION BATTERIES

CROSS-REFERENCE TO RELATED APPLICATIONS

The present application claims the benefit of priority to U.S. Provisional Patent Application No. 63/400,938, filed on Aug. 25, 2022, the entirety of which is incorporated herein by reference for all purposes.

FIELD

The present disclosure relates generally to the field of recycling of spent lithium ion batteries, and in particular to systems and methods for recovery of metals from spent lithium ion batteries.

BACKGROUND

The number of spent lithium-based batteries is projected to grow rapidly as electric powered equipment, such as automobiles, power tools, etc., becomes commonplace. Given that the amount of metals and other natural resources that are used as raw materials for lithium-based batteries is finite, economically viable methods of recycling the spent batteries are necessary to keep the cost of the raw materials (and consequently, of the batteries), affordable.

Lithium-based batteries typically include plastics, which form the protective cover for the battery and portions of the separator for the battery. The electrodes are primarily metals such as copper, iron and aluminum depending on the specific battery chemistry being used. The batteries also include what is typically known as black mass, which generally includes graphite and salts of several valuable metals (depending on the specific battery chemistry) such as iron, cobalt, manganese, nickel, copper and aluminium, in addition to lithium, which forms less than about 1% of the weight of the scrap battery, and typically less than about 2% of the weight of the active mass of the battery. The black mass for some of the novel battery chemistries may also include other metals, such as rare earths, in trace amounts.

Most current technologies for recycling spent lithium batteries utilize pyrometallurgical processes such as smelting which require high temperatures, e.g., in a range from about 500° C. to about 1000° C. Consequently, the energy costs associated with the recycling process are high, resulting in the cost of recovery of metals to be substantially higher than the market value of the recovered metals. Moreover, the amount of each metal recovered is also typically lower compared to, e.g., hydrometallurgical processes. These technologies are, therefore, unsustainable in the long term.

While hydrometallurgical processes can provide higher yields, and potentially higher purity of recovered metals, these processes generally require heating a leaching solvate for a long time at relatively higher temperatures, e.g., in a range from about 80° C. to about 150° C. Thus, the energy requirements of such processes remains high. Moreover, handling of high temperature leaching solvates poses certain hazards which further increase the cost of such processes.

Consequently, current technologies for recycling spent batteries are not cost-effective relative to the technology for obtaining these materials anew. Cost-effective, low energy, sustainable, and low carbon-footprint technologies for recovering materials from spent batteries are, therefore, needed.

SUMMARY

The embodiments disclosed herein stem from the realization that high temperature and/or pyrochemical techniques are not necessary for recovering metals from a spent lithium ion battery. The present application discloses systems and methods for recovering metals from spent lithium ion batteries, e.g., from the black mass, using a leaching solvent. Because the leaching solvent used in the presently disclosed embodiments is an aqueous solution, microwave radiation can be utilized to reduce the time and energy required to heat the leaching solvent to a suitable temperature and to maintain the temperature at which the metals from the black mass dissolve in the leaching solvent. The embodiments also utilize a leaching solvent comprising an oxidizing agent for further increasing the efficiency of leaching metals out of the black mass.

The leaching solvent of the presently disclosed embodiments is selected such that it can dissolve all the various metals used in a lithium ion battery. Thus, once the black mass from a lithium ion battery are contacted with the leaching solvent at a suitable temperature, all the various metals from the battery are dissolved into the leaching solvent. The embodiments disclosed herein further utilize the realization that once the various metals are dissolved in the leaching solvent, salts of various metals can be precipitated at different pH values. Thus, advantageously, the embodiments disclosed herein enable separation of the different metals present in a lithium ion battery without having to use a pyrochemical process, thereby substantially reducing the time, cost and carbon footprint for recovery of metals from a lithium ion battery.

Further, as will be apparent, the systems and methods disclosed herein enable recovery of high purity salts of valuable metals, which can be further utilized for obtaining high purity valuable metals.

Accordingly, in at least one embodiment, a method of obtaining metal salt from a spent lithium-ion (Li-ion) battery contacting a leaching solvent to a portion of the spent Li-ion battery to obtain a first dispersion. The first dispersion is heated to a temperature in a range from 50° C. to 90° C. by applying microwave radiation. The temperature of the electrode dispersion is maintained to be in the range from 50° C. to 90° C. for a period in a range from 10 seconds to 5 minutes by further applying microwave radiation to the heated electrode dispersion. The first dispersion is then filtered to obtain a first filtrate. A first base is contacted with the first filtrate to increase a pH of the first filtrate to a first predetermined value at which a first metal salt is precipitated from the first filtrate.

In accordance with at least one embodiment, a system for recycling a spent Li-ion battery may include a crusher, a cleaning chamber, one or more storage tanks, two or more reaction chambers, and a controller. The crusher is configured to break a cell of the spent Li-ion battery into pieces. The cleaning chamber is configured to clean the pieces, e.g., using water and/or other neutral solvent(s). The one or more storage tanks are configured to store chemicals and may include at least one first storage tank storing a first base. The two or more reaction chambers are coupled to the one or more storage tanks via one or more pumps and valves. At least a first of the two or more reaction chambers is coupled to a microwave generator configured to provide microwave generation to reactants in the first reaction chamber, and at least a second of the two or more reaction chambers is coupled to the first storage tank. The controller is configured to control the one or more pumps and/or the one or more valves to modulate a rate of transfer and amount of chemicals being transferred from the one or more storage tanks to a corresponding of the two or more reaction chambers. The controller is further configured to control the microwave generator to modulate an amount of microwave radiation provided to the first reaction chamber so as to heat the reactants in the first reaction chamber to a temperature in a predetermined range and maintain the temperature of the reactants to be in the predetermined range for a predetermined period of time. A first filtrate from reaction product from the first reaction chamber is transferred to the second reaction chamber to be contacted with the first base to increase a pH of the first filtrate to a first predetermined value so as to precipitate a first metal salt.

Additional features and advantages of the subject technology will be set forth in the description below, and in part will be apparent from the description, or may be learned by practice of the subject technology. The advantages of the subject technology will be realized and attained by the structure particularly pointed out in the written description and embodiments hereof as well as the appended drawings.

It is to be understood that both the foregoing general description and the following detailed description are exemplary and explanatory and are intended to provide further explanation of the subject technology.

BRIEF DESCRIPTION OF THE DRAWINGS

Various features of illustrative embodiments of the present disclosure are described below with reference to the drawings. The illustrated embodiments are intended to illustrate, but not to limit, the present disclosure. The drawings contain the following figures.

DETAILED DESCRIPTION

Figure 1:
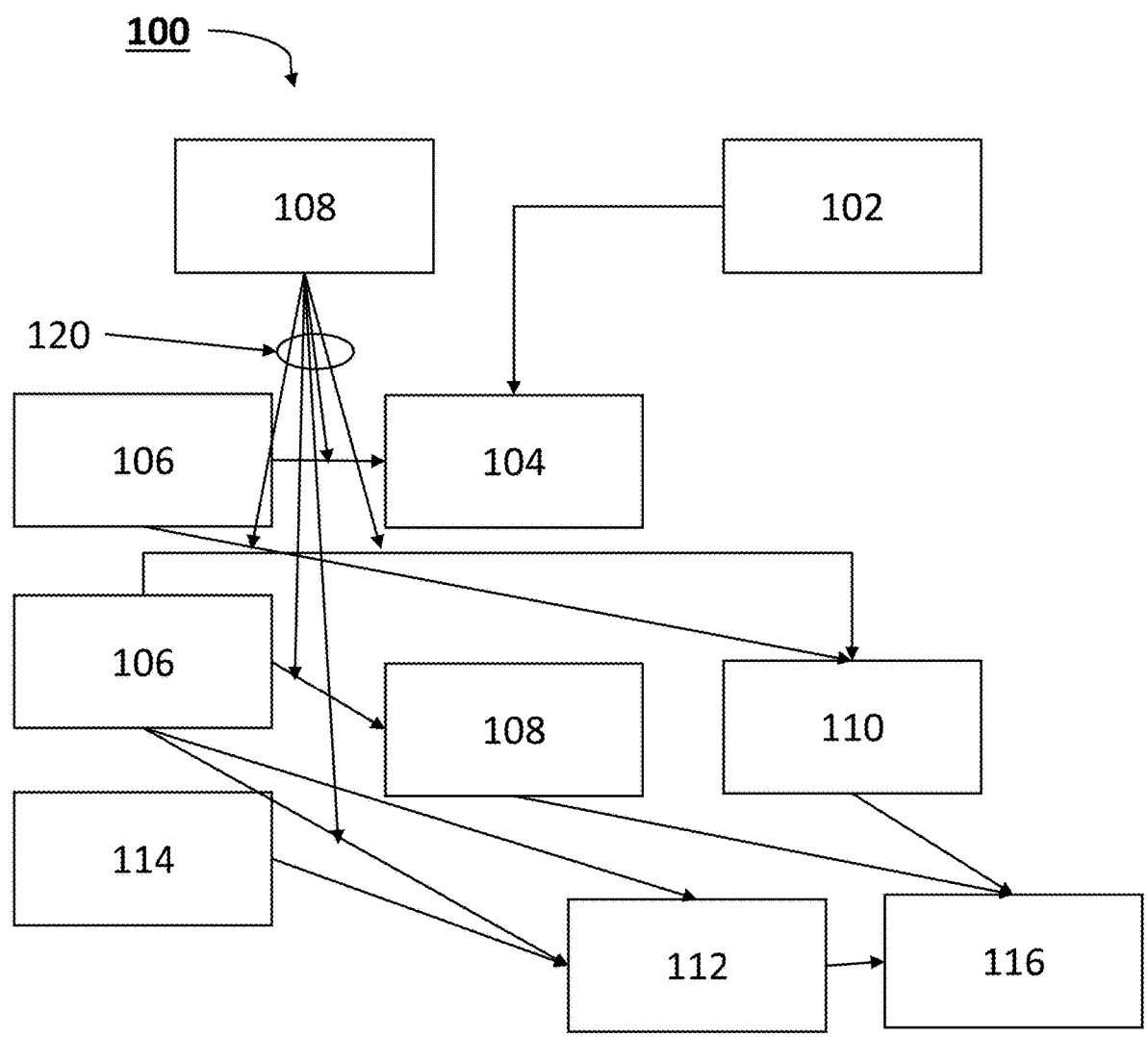
FIG. 1 schematically shows an apparatus for recycling a spent lithium ion battery in accordance with at least some embodiments of the present disclosure.

In the following detailed description, numerous specific details are set forth to provide a full understanding of the subject technology. It should be understood that the subject technology may be practiced without some of these specific details. In other instances, well-known structures and techniques have not been shown in detail so as not to obscure the subject technology.

Further, while the present description sets forth specific details of various embodiments, it will be appreciated that the description is illustrative only and should not be construed in any way as limiting. Additionally, it is contemplated that although particular embodiments of the present disclosure may be disclosed or shown in the context of recycling certain types of lithium ion batteries, such embodiments can be used with all types of lithium ion batteries using modifications within the scope of the present disclosure and claims. Furthermore, various applications of such embodiments and modifications thereto, which may occur to those who are skilled in the art, are also encompassed by the general concepts described herein.

A typical lithium-ion battery, depending on the battery chemistry used, may contain graphite powder, and salts of one or more valuable metals such as lithium, aluminum, copper, cobalt, manganese, nickel, iron, and the like. Some of the commonly used lithium-ion battery types and the content of various metals and other materials in those battery types is provided in tables 1-6.

TABLE 1

Lithium Cobalt Oxide (LCO) batteries
LCO

| Components | % |
|---|---|
| With Respect to Scrap | |
| Aluminum | 8.00% |
| Copper | 17.00% |
| Graphite (anode) | 16.00% |
| Active cathode material | 24.00% |
| Compositions in Active Mass | |
| Lithium | 1.70% |
| Cobalt | 14.45% |
| Nickel | 0.00% |
| Aluminum | 0.00% |
| Oxygen | 7.85% |
| Composition With Respect to Black Mass | |
| Al (foil particles) | 0.97% |
| Cu (foil particles) | 2.06% |
| Graphite | 38.79% |
| Lithium | 4.12% |
| Cobalt | 35.03% |
| Nickel | 0.00% |
| Aluminum | 0.00% |
| Oxygen | 19.03% |
| Other Variables | |
| % of Al and Cu retained in black mass | 5.00% |

TABLE 2

Lithium Nickel Cobalt Aluminum (LNCA) batteries
LNCA

| Components | % |
|---|---|
| With Respect to Scrap | |
| Aluminum | 8.00% |
| Copper | 17.00% |
| Graphite (anode) | 16.00% |
| Active cathode material | 24.00% |
| Compositions in Active Mass | |
| Lithium | 1.73% |
| Cobalt | 2.20% |
| Nickel | 11.73% |
| Aluminum | 0.34% |
| Oxygen | 7.99% |
| Composition With Respect to Black Mass | |
| Al (foil particles) | 0.97% |
| Cu (foil particles) | 2.06% |
| Graphite | 38.79% |
| Lithium | 4.19% |
| Cobalt | 5.33% |
| Nickel | 28.43% |

TABLE 2-continued

Lithium Nickel Cobalt Aluminum (LNCA) batteries
LNCA

| Components | % |
|---|---|
| Aluminum | 0.82% |
| Oxygen | 19.37% |
| Other Variables | |
| % of Al and Cu retained in black mass | 5.00% |

TABLE 3

Nickel Manganese Cobalt ⅓ proportion each in the active cathode (NMC111) batteries
NMC111

| Components | % |
|---|---|
| With Respect to Scrap | |
| Aluminum | 8.00% |
| Copper | 17.00% |
| Graphite (anode) | 16.00% |
| Active cathode material | 24.00% |
| Compositions in Active Mass | |
| Lithium | 1.73% |
| Cobalt | 4.89% |
| Nickel | 4.86% |
| Manganese | 4.56% |
| Oxygen | 7.96% |
| Composition With Respect to Black Mass | |
| Al (foil particles) | 0.97% |
| Cu (foil particles) | 2.06% |
| Graphite | 38.79% |
| Lithium | 4.19% |
| Cobalt | 11.85% |
| Nickel | 11.78% |
| Manganese | 11.05% |
| Oxygen | 19.30% |
| Other Variables | |
| % of Al and Cu retained in black mass | 5.00% |

TABLE 4

Nickel Manganese Cobalt 60/20/20% proportion each in the active cathode (NMC622) batteries
NMC622

| Components | % |
|---|---|
| With Respect to Scrap | |
| Aluminum | 8.00% |
| Copper | 17.00% |
| Graphite (anode) | 16.00% |
| Active cathode material | 24.00% |
| Compositions in Active Mass | |
| Lithium | 1.72% |
| Cobalt | 2.92% |
| Nickel | 8.72% |
| Manganese | 2.72% |
| Oxygen | 7.92% |
| Composition With Respect to Black Mass | |
| Al (foil particles) | 0.97% |
| Cu (foil particles) | 2.06% |
| Graphite | 38.79% |
| Lithium | 4.17% |
| Cobalt | 7.08% |

TABLE 4-continued

Nickel Manganese Cobalt 60/20/20% proportion each in the active cathode (NMC622) batteries
NMC622

| Components | % |
|---|---|
| Nickel | 21.14% |
| Manganese | 6.59% |
| Oxygen | 19.20% |
| Other Variables | |
| % of Al and Cu retained in black mass | 5.00% |

TABLE 5

Nickel Manganese Cobalt 80/10/10% proportion each in the active cathode (NMC811) batteries
NMC811

| Components | % |
|---|---|
| With Respect to Scrap | |
| Aluminum | 8.00% |
| Copper | 17.00% |
| Graphite (anode) | 16.00% |
| Active cathode material | 24.00% |
| Compositions in Active Mass | |
| Lithium | 1.71% |
| Cobalt | 1.46% |
| Nickel | 11.58% |
| Manganese | 1.36% |
| Oxygen | 7.89% |
| Composition With Respect to Black Mass | |
| Al (foil particles) | 0.97% |
| Cu (foil particles) | 2.06% |
| Graphite | 38.79% |
| Lithium | 4.15% |
| Cobalt | 3.54% |
| Nickel | 28.07% |
| Manganese | 3.30% |
| Oxygen | 19.13% |
| Other Variables | |
| % of Al and Cu retained in black mass | 5.00% |

TABLE 6

Lithium Iron Phosphate (LFP) batteries
LFP

| Components | % |
|---|---|
| With Respect to Scrap | |
| Aluminum | 8.00% |
| Copper | 17.00% |
| Graphite (anode) | 15.30% |
| Active cathode material | 22.20% |
| Compositions in Active Mass | |
| Lithium | 0.98% |
| Iron | 7.86% |
| Phosphorus | 4.35% |
| Oxygen | 9.00% |
| Composition With Respect to Black Mass | |
| Al (foil particles) | 1.032% |
| Cu (foil particles) | 2.19% |
| Graphite | 39.48% |
| Lithium | 2.53% |

TABLE 6-continued

Lithium Iron Phosphate (LFP) batteries
LFP

| Components | % |
|---|---|
| Iron | 20.28% |
| Phosphorus | 11.23% |
| Oxygen | 23.23% |
| Other Variables | |
| % of Al and Cu retained in black mass | 5.00% |

As evident from Tables 1-6, substantial amount of valuable metals can be recovered from spent Li-ion batteries. The technology disclosed herein makes it possible to recover various valuable metals from a spent Li-ion battery economically, sustainably, and at scale. The methods disclosed herein have low energy requirements, thereby reducing the carbon footprint of the recycling process. Further, the methods disclosed herein provide high-purity salts of various valuable metals, which can advantageously used directly in manufacturing Li-ion batteries instead of obtaining the salts from mined metals.

FIG. 1 shows a schematic diagram of an apparatus 100 for recycling a spent lithium ion battery in accordance with at least some embodiments of the present disclosure. In some embodiments, the apparatus 100 includes a crusher 102, a cleaning chamber 104, one or more chemical storage tanks 106, a controller 108, two or more reaction chambers such as, e.g., a separation chamber 110, a precipitation chamber 112, one or more clean water tanks 114, one or more recycled water tanks 116, and one or more pumps 120.

In some embodiments, the crusher 102 is designed to break a cell of a spent lithium ion battery (also referred to herein as "spent battery" for convenient reference) into pieces having a dimension in a range from about 1 mm to about 5 cm. In some embodiments, the crusher 102 may include a chamber that can be sealed and evacuated to reduce the amount of oxygen in the chamber, thereby preventing oxidation of the pieces of the spent battery. In some embodiments, the chamber may repressurized using an inert gas such as, for example, nitrogen or argon.

The cleaning chamber 104, in some embodiments, is designed to clean the pieces of the spent battery obtained from the crusher 102. Cleaning the pieces may include processes such as, for example, washing the pieces with water (e.g., distilled water), sonicating the pieces while in water or after drying the washed pieces, drying the washed and/or sonicated pieces, and the like.

In some embodiments, cleaning may be performed at room temperature or at an elevated temperature. In some embodiments, cleaning may be performed in air at atmospheric pressure. Alternatively or additionally, cleaning may be performed under a vacuum and/or in an inert atmosphere such as, for example, in presence of nitrogen, argon, or the like.

In some embodiments, cleaning the pieces may include dispersing the pieces of the spent battery in a fluid and filtering the pieces using one or more filtration processes such as, for example, using one or more meshes, each having a different mesh size. In some embodiments, the mesh size may range from about 50 μm to about 5 mm. For example, a filtration process may include sequential filtering of the dispersion through a mesh having a mesh size of about 5 mm, followed by filtering through a mesh having a mesh size of about 1 mm, followed by filtering through a mesh having a mess size of about 500 μm, followed by filtering through a mesh having a mess size of about 50 μm. In some embodiments, one or more of these steps may be omitted. Alternatively or additionally, one or more filtration steps may be added in the process.

In some embodiments, the one or more storage tanks 106 may store chemicals such as leaching chemicals, acids, neutralizing solutions (e.g., alkali solutions, acid solutions, salt solutions, etc.), water, and/or other proprietary solutions that include one or more chemicals useful in the recycling process.

In some embodiments, each of the one or more storage tanks 106 may be connected to two or more reaction chambers 110,112. Further, the connection between a storage tank and a reaction chamber may include a control valve which can be controlled by a controller 108. The controller 108 is configured to control, via the control valve (or other mechanism), the amount of chemical transferred from the storage tank 106 to the reaction chambers 110, 112. For example, the controller 108 may control parameters such as, volume and/or flow rate of the chemical being transferred from the storage tank to the corresponding reaction chamber.

In some embodiments, the controller 108 may utilize a control parameter such as, for example, pH, temperature, volume, turbidity, density, and/or other parameters associated with a chemical in a given reaction chamber to control the volume, mass, and/or flow rate of chemicals being transferred from the storage tank to the given reaction chamber. Consequently, the system 100 may further include one or more sensors for measuring one or more corresponding control parameters and measuring one or more of the controlled parameters (e.g., volume, mass, flow rate, etc.).

In some embodiments, the controller 108 may control the temperature of the material in the reaction chamber, e.g., by controlling the amount of heat delivered to the reaction chamber or the material within the reaction chamber. For example, in some embodiments, the controller 108 may control power input to a microwave generator coupled to the reaction chamber so as to control the microwave energy delivered to the material in the reaction chamber. The controller 108 may control the power input based on parameters such as, for example, the temperature of the material in the reaction chamber.

In some embodiments, the two or more reaction chambers may be connected to a clean water tank 114. The connection between the reaction chamber and the clean water tank may be controlled by a control valve in some embodiments. Similar to the connection between the reaction chambers and the storage tanks, the controller 108 may control, via the control valve, the amount and/or flow rate of water transferred from the clean water tank 114 to the reaction chamber based on parameters such as pH, temperature, volume, turbidity, density, and/or other parameters associated with the chemical in a given reaction chamber.

The two or more reaction chambers are further connected to a recycled water tank 116 in some embodiments. Upon completion of the reaction in the reaction chamber, any solid material generated, e.g., precipitated and/or separated in the reaction chamber is removed. Solid material may be removed, e.g., by filtration. In some embodiments, the remainder of the chemical, e.g., a filtrate, is neutralized using, e.g., a neutralizing solution which is introduced into the reaction chamber from a corresponding storage tank via control of a control valve by the controller.

In some embodiments, the neutralization process may be performed in several steps by sequentially increasing a pH of the filtrate by gradually adding the neutralizing solution so as to sequentially precipitate out different materials. For example, a first precipitate (e.g., a first metal salt) may be obtained at a first pH, a second precipitate may be obtained at a second pH and so forth. In such embodiments, the amount and flow rate of the neutralizing solution added to the reaction chamber may be controlled by the control valve based on a pH of the contents in the reaction chamber. In some embodiments, instead of a neutralizing solution, a neutralizing chemical, e.g., in solid state, may be added to the reaction chamber to increase the pH of the contents of the reaction chamber.

In some embodiments, after all possible precipitates resulting from the neutralization reaction are removed, e.g., by filtration, the remaining water may be transferred to a recycled water storage tank 116.

In some embodiments, the transfer of material to or from one or more of the storage tanks 106, the reaction chambers 110, 112, the clean water tank 114 and/or the recycled water tank 116 may be facilitated by one or more pumps 120. In some embodiments, the one or more pumps 120 are coupled to the controller 108 which can control the one or more pumps 120 so as to control the rate of flow and/or volume of the material being transferred.

In an aspect of the present disclosure, a suitable apparatus such as, for example, the apparatus 100, may be utilized for recycling spent batteries. In particular, in some embodiments, an apparatus such as apparatus 100 may be utilized for recovering salts of various metals found in spent Li-ion batteries such as, for example, salts of lithium, aluminum, copper, iron, nickel, cobalt and manganese.

Figure 2:
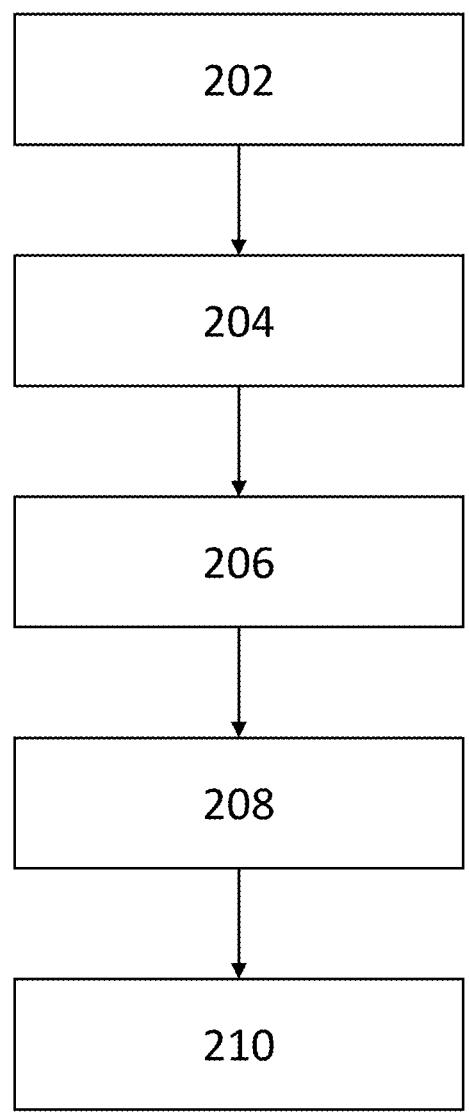
FIG. 2 shows a flow chart for a method of obtaining a metal salt from a spent lithium ion battery, in accordance with at least some embodiments of the present disclosure.

FIG. 2 illustrates a flow chart of a method 200 for obtaining metal salts from spent lithium ion batteries, in accordance with at least some embodiments of the present disclosure. The method 200 may include, at 202, contacting a leaching solvent to a portion of the spent Li-ion battery to obtain a first dispersion. The first dispersion is heated, at 204, to a temperature in a range from about 50° C. to about 90° C. by applying microwave radiation to the electrode dispersion. At 206, the temperature of the heated first dispersion is maintained to be in a range from about 50° C. to about 90° C. for a period in a range from about 10 seconds to about 5 minutes via controlled application of microwave radiation. At 208, the first dispersion is filtered to obtain a first filtrate. At 210, a first base is contacted to the first filtrate to increase a pH of the first filtrate to a first predetermined value at which a first metal salt is precipitated from the first filtrate.

In some embodiments, the portion of the spent Li-ion battery is obtained by crushing a lithium ion battery. The process for obtaining a suitable portion of the Li-ion battery may further include steps such as, for example, separation of the crushed portion via a sequence of sieves to separate material of different sizes. For example, in some embodiments, the separation may include separating coarse pieces having a size in a range from about 0.5 mm to about 5 mm by utilizing a suitable sieve, followed by further separating finer pieces having a size in a range from about 50 µm to about 0.5 mm by utilizing a second suitable sieve.

The portion of the spent Li-ion battery, e.g., fine pieces and/or black mass, may be introduced in a reaction chamber where, at 202, the fine pieces and/or black mass (together referred to hereinafter as "black mass" for convenient reference) are contacted with a leaching solvent. In some embodiments, the leaching solvent may include an acid such as, for example, sulfuric acid, hydrochloric acid, oxalic acid, etc. In some embodiments, the leaching solvent may include more than one acid.

In some embodiments, the leaching solvent may further include an oxidizing agent such as, for example, hydrogen peroxide or nitric acid. In some embodiments, the concentration of the leaching solvent acid may be in a range from about 0.5 N to about 10 N. In some embodiments, the leaching solvent may have a pH of about 0. In some embodiments, the pH of the leaching solvent may be in a range from about 0 to about 7.0. In some embodiments, the leaching solvent is introduced into the reaction chamber from a storage tank. The amount and/or flow rate of introduction of the leaching solvent may be controlled via a controller.

Table 7 provides the concentration for various materials used in the leaching solvent according to one example.

TABLE 7 specifications for leaching solvent according to an example.
Specifications of Leaching Solvent
Concentrations

| Sulfuric | 29% |
|---|---|
| L/S ratio | 10.00 |
| % of $H_2O_2$ | 3% |
| % of Proprietary reagent | 5% |

Upon introduction of the leaching solvent to the reaction chamber, the leaching solvent and the black mass are stirred, e.g., using a stirrer (which may or may not be controlled by a controller), to form a first dispersion.

Microwave radiation is then applied, at 204, to the first dispersion so as to heat the first dispersion to a temperature in a range from about 50° C. to about 90° C. Thus, at 206, the first dispersion may be heated to a temperature of, e.g., about 50° C., about 55° C., about 60° C., about 65° C., about 70° C., about 75° C., about 80° C., about 85° C., about 90° C., or any temperature between any two of these values.

In some embodiments, the application of the microwave radiation is controlled by a controller which uses a temperature (e.g., determined using a temperature sensor coupled to the controller) in the reaction chamber as a feedback parameter. In some embodiments, the controller may be a proportional-integral-derivative (PID) controller, although other types of controllers are contemplated within the scope of the present disclosure.

In addition, in some embodiments, the first dispersion in the reaction chamber is stirred while being heated. Stirring of the first dispersion may be helpful in distributing the heat generated by application of microwave radiation more evenly through the first dispersion. Additionally or alternately, the first dispersion may be sonicated by application of, e.g., ultrasound, during the heating process.

Once the temperature of the first dispersion reaches a desired value, at 208, application of microwave radiation is continued so as to maintain the temperature at the desired value for a period in a range from about 10 seconds to about 5 minutes. For example, the temperature of the first dispersion may be maintained at the desired value for about 10 seconds, about 15 seconds, about 20 seconds, about 25 seconds, about 30 seconds, about 35 seconds, about 40 seconds, about 45 seconds, about 50 seconds, about 55 seconds, about 60 seconds, about 70 seconds, about 80 seconds, about 90 seconds, about 100 seconds, about 120 seconds, about 140 seconds, about 160 seconds, about 180 seconds, about 200 seconds, about 220 seconds, about 240 seconds, about 260 seconds, about 280 seconds, about 300 seconds or any amount of time between any two of these values.

In some embodiments, the continued application of microwave radiation at 204 is controlled using a controller such as, for example, the same controller used in 204. It will be appreciated that the continued application of microwave radiation does not necessary mean constant application of microwave radiation. Thus, in some embodiments, at 206, the microwave radiation may be applied in pulses. Each pulse may have a pulse width ranging from about 0.5 seconds to 5 seconds or longer. The microwave pulses may or may not have the same peak power. Thus, in some embodiments, the continued application of microwave radiation may include application of pulsed waves of microwave radiation and controlling parameters such as, for example, pulse width, peak power for the pulse, pulse rate and the total amount of time for which the microwave radiation is applied to the first dispersion.

In addition, at 206, the first dispersion may be stirred and/or sonicated using ultrasound so as to disperse the heat generated from application of microwave radiation more uniformly through the first dispersion.

After maintaining the temperature of the first dispersion for predetermined period of time, the first dispersion, at 208, the first dispersion is filtered to obtain a first filtrate. In some embodiments, the first dispersion may be cooled to room temperature prior to filtering at 208. In some embodiments, filtering the first dispersion may include passing the first dispersion through one or more filters, meshes or sieves. In some embodiments, the filters, meshes or sieves may be designed or selected to enable separation of solid matter having different sizes. For example, the a first mesh, filter or sieve may separate solid matter having a size greater than about 1 mm; a second mesh, filter or sieve may separate solid matter having a size in a range from about 0.5 mm to about 1 mm; a third mesh, filter or sieve may separate solid matter having a size in a range from about 0.1 mm to about 0.5 mm; a fourth mesh, filter or sieve may separate solid matter having a size in a range from about 50 µm to about 100 µm; a fifth mesh, filter or sieve may separate solid matter having a size in a range from about 10 µm to about 50 µm; a sixth mesh, filter or sieve may separate solid matter having a size in a range from about 1 µm to about 10 µm; and so forth.

It will be appreciated that the salts of valuable metals from the black mass dissolve in the leaching solvent, and the filtration process removes the insoluble portion of the black mass, which primarily includes graphite. Thus, at the end of 208, the first filtrate primarily includes the dissolved metal-acid salts of valuable metals included in the battery. In other words, the first filtrate may include metal ions in the highest oxidation state (because of the presence of the oxidizing agent in the leaching solvent).

The first filtrate may then be transferred to another reaction chamber, e.g., a precipitation chamber, where, at 210, a first base in contacted with the first filtrate. The first base may be a solution or a solid. In some embodiments, the first base includes one or more basic salts such as, for example, sodium carbonate, potassium carbonate, ammonium carbonate, sodium phosphate, sodium hydroxide, potassium hydroxide, ammonium hydroxide, ammonia, and the like.

In some embodiments, the first base may be introduced gradually in the precipitation chamber so as to gradually increase the pH of the first filtrate. As the pH of the first filtrate increases, different metal ions may react with the first base, resulting in formation of corresponding metal-base salts, which are generally insoluble in water. Consequently, as the pH of the first filtrate increases, different metal-base salts may precipitate from the first filtrate at different pH values.

In some embodiments, after the pH of the first filtrate has reached a first predetermined value at which a first metal-base salt precipitates out, the remaining portion of the first filtrate is filtered to obtain a second filtrate. In some embodiments, the second filtrate is transferred to another precipitation chamber. In some embodiments, a second base (which may be same or different from the first base) is contacted with the second filtrate to increase the pH of the second filtrate further until the pH of the second filtrate reaches a second predetermined value at which a second metal-base salt precipitates out.

In some embodiments, the process may be continued to sequentially increase the pH of the corresponding filtrate to various predetermined values at which different metal-base salts precipitate out of the filtrate, until all valuable metals are removed from the filtrate as different metal-base salts and the remainder of the filtrate includes a mixture of metal hydroxides for the portion of metals that remain soluble in water after precipitation of the insoluble metal-base salts.

Figure 3:
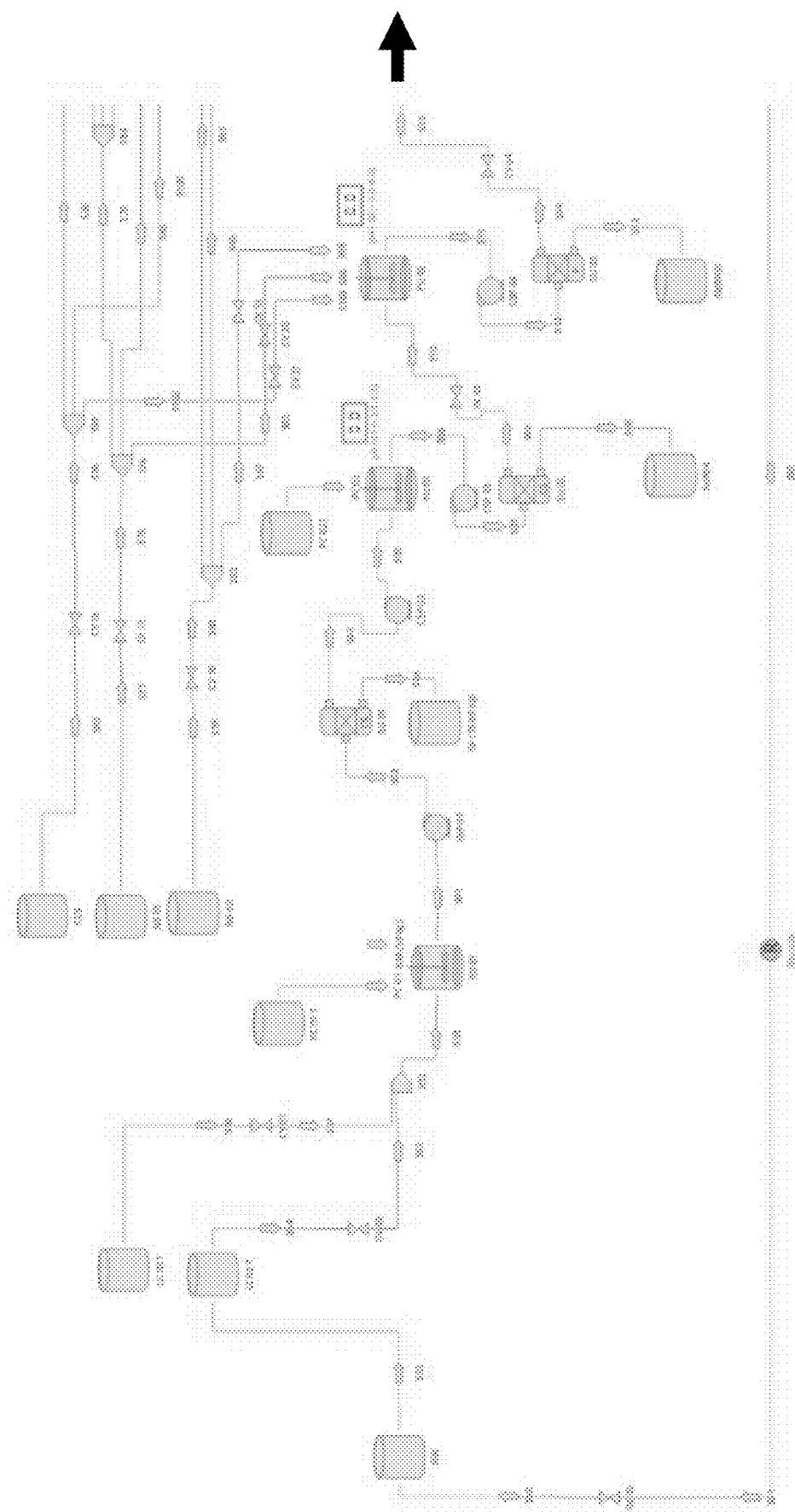
FIG. 3 is a process flow diagram for the process used in the method of obtaining a metal salt from a spent lithium ion battery, in accordance with at least some embodiments of the present disclosure.

FIG. 3 illustrates a process flow diagram of an example process for obtaining metal salts from a spent Li-ion battery in accordance with at least some embodiments of the present disclosure. Table 8 provides a list of abbreviations used in the process flow diagram and their corresponding meanings.

TABLE 8

Abbreviations in the process flow diagram:
Equipment Nomenclature

| | |
|---|---|
| LC 01 T | Leaching chemical 1 storage tank |
| LC 02 T | Leaching chemical 2 storage tank |
| CV (01-35) | Control valve |
| PC 01 T | Proprietary chemical 01 storage tank |
| BM | Black mass |
| RU 01 | Reactor 1 |
| CSP (01-11) | Centrifugal sealless pump |
| SU (01-09) | Separation unit |
| PU (01-08) | Precipitation unit |
| PC 02 T | Proprietary chemical 02 storage tank |
| NS 01 | Neutralization solution 01 |
| NS 02 | Neutralization solution 02 |
| CCS | Carbonated chemical solution |
| NT | Neutralization tank |
| RW | Recycled water |
| CU | Crystallization unit |
| EU | Evaporator unit |

FIG. 3 illustrates different precipitation units PU01-PU08 in which different metal-base salts are precipitated by sequentially increasing the pH of the filtrate therein. Thus, for example, iron precipitates at the first precipitation unit PU01 when the pH of the filtrate is in a range from 2.5-3.2. Once the insoluble iron salt is removed, the resultant solution is transferred to the second precipitation unit PU02, where more base is added to increase the pH to be in a range from 3.0-4.0, at which insoluble aluminum salt precipitates out. Addition of the base can be further continued to increase the pH to be in a range from 4.2-4.9, at which cobalt precipitates, then to be in a range from 5.0-5.8, at which copper precipitates, and so on until manganese (pH range from 5.0-6.0), nickel (pH range from 6.1-7.6), and lithium (pH range from 8.5-10.5) precipitate from the solution.

One of ordinary skill in the art will appreciate that while the process flow diagram of FIG. 3 shows iron precipitating as a phosphate, and aluminum precipitating as a hydroxide, other metal-base salts can be precipitated at different pH values depending on the base. Thus, for example, all of the metal salts can be precipitated as phosphates, or carbonates depending on the particular base being used, and will be precipitated at different corresponding pH values. Advantageously, because the pH range is controllable, and the only a particular metal salt can be precipitated within a particular pH range, the resulting precipitates have high purity.

One of ordinary skill in the art will further appreciate that the metal-base salts precipitate out of the filtrate because of their low solubility in water. Nevertheless, these metal-base salts are not completely insoluble, and thus, some of the metal may remain in the solution. Consequently, even after adding saturation amount of the base (e.g., when the pH of the filtrate is in a range from 13.5-14.0), the remaining solution is primarily a mixture of various metal hydroxides.

In some embodiments, the final filtrate is neutralized using an acid, e.g., sulfuric acid, to bring the pH of the solution to be in a neutral range. The neutralized solution can then be evaporated to obtain salt and water which can be recycled into the process.

Thus, the present disclosure provides a system and method for obtaining metal salts from spent lithium ion batteries. The method disclosed herein is a low temperature method that uses microwave radiation to heat a dispersion of black mass to improve energy efficiency. Further, because the process does not require smelting or other high temperature processes, there are no emitted gases, resulting is zero-pollution. Advantageously, the water used in the process can also be recycled, thereby further reducing waste.

EXAMPLES 100 kg of LCO, LNCA, NMC622, and LFP (25 wt % contribution) batteries were recy-cled using the method disclosed herein to recover electrode metals.

Table 9 provides the amount electrode metals recovered following the process.

TABLE 9

Amounts of metal (salts) recovered after precipitation.

| Compounds | Amount (kg) |
| --- | --- |
| $FePO_4$ | 13.53 |
| $Al(OH)_3$ | 3.34 |
| $CoCO_3$ | 23.22 |
| $CuCO_3$ | 3.95 |
| $MnCO_3$ | 3.35 |
| $NiCO_3$ | 24.31 |
| $Li_2CO_3$ | 38.7 |

Further Considerations

In some embodiments, any of the clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

The subject technology is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination, and placed into a respective independent clause, e.g., clause 1 or clause 5. The other clauses can be presented in a similar manner.

Clause 1. A method of obtaining a metal salt from a spent lithium-ion (Li-ion) battery, the method comprising: contacting a leaching solvent to a portion of the spent Li-ion battery to obtain a first dispersion; heating the first dispersion to a temperature in a range from 50° C. to 90° C. by applying microwave radiation; maintaining the temperature of the first dispersion in the range from 50° C. to 90° C. for a period in a range from 10 seconds to 5 minutes by further applying microwave radiation to the heated first dispersion; filtering the first dispersion to obtain a first filtrate; and contacting a first base with the first filtrate to increase a pH of the first filtrate to a first predetermined value at which a first metal salt is precipitated from the first filtrate.

Clause 2. The method of Clause 1, wherein the first metal salt comprises lithium, aluminum, iron, cobalt, copper, manganese, and/or nickel.

Clause 3. The method of Clause 1, wherein the leaching solvent comprises sulfuric acid.

Clause 4. The method of Clause 3, wherein the leaching solvent further comprises an oxidizing agent.

Clause 5. The method of Clause 4, wherein the oxidizing agent is hydrogen peroxide.

Clause 6. The method of Clause 1, wherein the leaching solvent has a pH in a range from 0 to 7.0

Clause 7. The method of Clause 1, wherein heating the first dispersion further comprises stirring the first dispersion while applying the microwave radiation.

Clause 8. The method of Clause 1, wherein maintaining the temperature of the first dispersion comprises controlling application of the microwave radiation using a controller.

Clause 9. The method of Clause 1, wherein heating the first dispersion comprises heating the first dispersion to a temperature in a range from 60° C. to 80° C.

Clause 10. The method of Clause 1, wherein maintaining the temperature comprises maintaining the temperature of the first dispersion in a range from 60° C. to 80° C., for a period in a range from 30 seconds to 5 minutes.

Clause 11. The method of Clause 1, wherein the portion of the spent lithium-ion battery comprises metal pieces, and a black mass comprising graphite and metal oxides.

Clause 12. The method of Clause 11, wherein filtering the first dispersion comprises filtering the first dispersion through a sieve.

Clause 13. The method of Clause 1, wherein heating the first dispersion further comprises continuously stirring the first dispersion while applying the microwave radiation.

Clause 14. The method of Clause 1, wherein maintaining the temperature of the first dispersion further comprises continuously stirring the first dispersion while applying the microwave radiation.

Clause 15. The method of Clause 1, wherein the first base comprises sodium carbonate and/or ammonium carbonate.

Clause 16. The method of Clause 1, further comprises obtaining a second filtrate following the precipitation of the first metal salt.

Clause 17. The method of Clause 16, further comprising contacting a second base with the second filtrate to increase a pH of the second filtrate to a second predetermined value to precipitate a second metal salt.

Clause 18. A system for recycling a spent lithium ion battery, the system comprising: a crusher configured to break a cell of the spent lithium ion battery into pieces; a cleaning chamber configured to clean the pieces; one or more storage tanks configured to store chemicals, including at least one first storage tank storing a first base; two or more reaction chambers coupled to the one or more storage tanks via one or more pumps and valves, at least a first of the two or more reaction chambers being coupled to a microwave generator configured to provide microwave radiation to reactants in the first reaction chamber and at least a second of the two or more reaction chambers being coupled to the first storage tank; and a controller. The controller is configured to control: the one or more pumps and/or the one or more valves to modulate rate of transfer and amount of chemicals being transferred from the one or more storage tanks to a corresponding of the two or more reaction chambers, and the microwave generator to modulate an amount of microwave radiation provided to the first reaction chamber so as to heat the reactants in the first reaction chamber to a temperature in a predetermined range, and maintain the temperature of the reactants to be in the predetermined range for a predetermined period of time. The cleaned pieces are disposed in the first reaction chamber to be contacted with a leaching solvent. A first filtrate from reaction product from the first reaction chamber is transferred to the second reaction chamber to be contacted with the first base to increase a pH of the first filtrate to a first predetermined value so to precipitate a first metal salt.

Clause 19. The system of Clause 18, wherein at least one of the one or more reaction chambers includes a stirrer configured to stir the reactants therein.

Clause 20. The system of Clause 18, wherein the crusher comprises a chamber configured to be maintained under vacuum and/or have an inert atmosphere.

Clause 21. The system of Clause 18, wherein the leaching solvent comprises sulfuric acid and an oxidizing agent.

Clause 22. The system of Clause 18, wherein the predetermined temperature range is from 50° C. to 90° C.

Clause 23. The system of Clause 18, wherein the predetermined period of time is in a range from 10 seconds to 5 minutes.

Clause 24. The system of Clause 18, wherein the leaching solvent has a pH in a range from 0 to 7.0.

Clause 25. The system of Clause 18, wherein maintaining the temperature comprises maintaining the temperature of the electrode dispersion in a range from 60° C. to 80° C., for a period in a range from 30 seconds to 5 minutes.

Clause 26. The system of Clause 18, wherein the first base comprises sodium carbonate and/or ammonium carbonate.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the term "about" preceding a quantity indicates a variance from the quantity. The variance may be caused by manufacturing tolerances or may be based on differences in measurement techniques. The variance may be up to 10% from the listed value in some instances. Those of ordinary skill in the art would appreciate that the variance in a particular quantity may be context dependent and thus, for example, the variance in a dimension at a micro or a nano scale may be different than variance at a meter scale.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A method of obtaining a metal salt from a spent lithium-ion (Li-ion) battery, the method comprising:
    contacting a leaching solvent to a portion of the spent Li-ion battery to obtain a first dispersion;
    heating the first dispersion to a temperature in a range from 50° C. to 90° C. by applying microwave radiation;
    maintaining the temperature of the first dispersion in the range from 50° C. to 90° C. for a period in a range from 10 seconds to 5 minutes by further applying microwave radiation to the heated first dispersion;
    filtering the first dispersion to obtain a first filtrate; and
    contacting a first base with the first filtrate to increase a pH of the first filtrate to a first predetermined value at which a first metal salt is precipitated from the first filtrate.

2. The method of claim 1, wherein the first metal salt comprises lithium, aluminum, iron, cobalt, copper, manganese, and/or nickel.

3. The method of claim 1, wherein the leaching solvent comprises sulfuric acid.

4. The method of claim 3, wherein the leaching solvent further comprises an oxidizing agent.

5. The method of claim 4, wherein the oxidizing agent is hydrogen peroxide.

6. The method of claim 1, wherein the leaching solvent has a pH in a range from 0 to 7.0.

7. The method of claim 1, wherein heating the first dispersion further comprises stirring the first dispersion while applying the microwave radiation.

8. The method of claim 1, wherein maintaining the temperature of the first dispersion comprises controlling application of the microwave radiation using a controller.

9. The method of claim 1, wherein heating the first dispersion comprises heating the first dispersion to a temperature in a range from 60° C. to 80° C.

10. The method of claim 1, wherein maintaining the temperature comprises maintaining the temperature of the first dispersion in a range from 60° C. to 80° C., for a period in a range from 30 seconds to 5 minutes.

11. The method of claim 1, wherein the portion of the spent lithium-ion battery comprises metal pieces, and a black mass comprising graphite and metal oxides.

12. The method of claim 11, wherein filtering the first dispersion comprises filtering the first dispersion through a sieve.

13. The method of claim 1, wherein heating the first dispersion further comprises continuously stirring the first dispersion while applying the microwave radiation.

14. The method of claim 1, wherein maintaining the temperature of the first dispersion further comprises continuously stirring the first dispersion while applying the microwave radiation.

15. The method of claim 1, wherein the first base comprises sodium carbonate and/or ammonium carbonate.

16. The method of claim 1, further comprises obtaining a second filtrate following the precipitation of the first metal salt.

17. The method of claim 16, further comprising contacting a second base with the second filtrate to increase a pH of the second filtrate to a second predetermined value to precipitate a second metal salt.

* * * * *